US009507400B2

United States Patent
Knepper et al.

(10) Patent No.: US 9,507,400 B2
(45) Date of Patent: Nov. 29, 2016

(54) INFORMATION HANDLING SYSTEM BATTERY CHARGE MANAGEMENT TO SUPPORT QUICK START

(71) Applicant: Dell Products L.P., Round Rock, TX (US)

(72) Inventors: Lawrence E. Knepper, Leander, TX (US); Richard C. Thompson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/676,965

(22) Filed: Apr. 2, 2015

(65) Prior Publication Data

US 2016/0291673 A1    Oct. 6, 2016

(51) Int. Cl.
*H02J 7/00* (2006.01)
*G06F 1/32* (2006.01)
*G06F 1/26* (2006.01)

(52) U.S. Cl.
CPC .............. *G06F 1/3212* (2013.01); *G06F 1/263* (2013.01); *H02J 7/007* (2013.01); *H02J 7/0057* (2013.01)

(58) Field of Classification Search
CPC ....... H02J 7/0047; H02J 7/008; H02J 7/0031
USPC .......................... 320/107, 132, 163; 713/340
See application file for complete search history.

(56) References Cited

U.S. PATENT DOCUMENTS

2009/0109324 A1* 4/2009 Kaplan .................. G03B 17/18
  348/372
2014/0068310 A1* 3/2014 Sultenfuss ................ G06F 1/28
  713/340

OTHER PUBLICATIONS

A. Sultenfuss et al., U.S. Appl. No. 13/596,460, filed Aug. 28, 2012, entitled Systems and Methods for Implementing Persistent Battery Shutdown for Information Handling Systems.

* cited by examiner

*Primary Examiner* — Edward Tso
*Assistant Examiner* — Aaron Piggush
(74) *Attorney, Agent, or Firm* — Terrile, Cannatti, Chambers & Holland, LLP; Robert W. Holland

(57) ABSTRACT

A portable information handling system manages battery charge to maintain a minimum level that supports boot by disconnecting the battery from a battery discharge path so that battery charge is lost substantially only to self-discharge. The battery automatically reconnects to the battery discharge path if external power becomes available to charge the battery. The minimum battery charge level provides adequate power in combination with the external power to support boot of the portable information handling system to an operational state.

14 Claims, 3 Drawing Sheets

INFORMATION HANDLING SYSTEM BATTERY CHARGE MANAGEMENT TO SUPPORT QUICK START

BACKGROUND OF THE INVENTION

1. Field of the Invention

The present invention relates in general to the field of information handling system power management, and more particularly to an information handling system battery charge management to support quick start.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have shrunk in size as end users have sought mobile devices that provide convenient access to information on the go. One example of such portable information handling systems is the smart phone, which typically accesses information through both mobile telephone provider wireless wide area networks (WWAN) and wireless local area network (WLAN) hotspots. Mobile telephones generally support web browser and email applications so that end users can view data anywhere that WWAN or WLAN communication are available. However, mobile telephone devices tend to have small surface areas that include small displays so that reading lengthy documents tends to be inconvenient. Tablet information handling systems offer an alternative with greater surface area for larger displays and more convenient reading. Tablet information handling systems tend to have a form factor that is too large for use as a mobile telephone handset yet small enough to allow convenient mobility for the end user. Tablet information handling systems with 7, 9 or 10 inch screens generally have enough surface area for an end user to conveniently run book reading or web browsing applications.

In an effort to shrink the size of portable information handling systems, manufacturers have turned to planar housings with a display using the majority of a front surface area, and a touchscreen in the display that provides a keyboard. Generally, to keep the thickness of the planar housing to a minimum, portable information handling systems include thin lithium ion batteries that rest in the rear surface of the portable information handling system. Often, the lithium ion batteries are less-expensive "dumb" batteries that do not include microcontrollers to measure charge, discharge and other battery status indicators. Because of the limited size of portable information handling system housings, the flat batteries typically have smaller cell sizes so that battery life under heavy usage tends to be limited. Portable information handling systems tend to include aggressive power savings measures to manage battery charge life, such as automated screen dimming and relatively rapid power down into reduced power states when left unused.

Another reason for aggressively managing portable information handling system charge life is that re-charging of portable information handling system batteries is often performed with relatively low power charging devices. For instance, portable information handling systems often include only a single micro-USB connector that acts as both a synchronization tool to interact with external information handling systems and a charger that accepts a charge as defined by the USB interface specification. Although USB charging is convenient, the lower available rate of charge tends to increase charging time to bring a battery to a full charge.

One difficulty with lower charger capacities is that portable information handling systems generally must rely at times on both the charger and the battery to provide adequate power to run. For example, during system startup a current surge tends to occur as subsystems boot to life. In order to provide enough current to boot, a power manager typically draws power from both the battery and an external power source if one is available. If the battery charge is low during a cold start power-on event, then lack of battery assistance often means that the external USB power source will not have enough current to startup the portable information handling system. Generally, portable information handling system batteries must have 3% to 5% of the battery full charge state in order for the portable information handling system to boot. If a battery does not have this minimal charge reserve when the information handling system attempts to boot, the battery has to charge until the minimal charge reserve is available. As a result, if a portable information handling system battery has an inadequate charge, boot is delayed until the battery can charge to a point that supports boot. In some instances, end users are forced to wait minutes to hours before their portable information handling system will boot.

SUMMARY OF THE INVENTION

Therefore a need has arisen for a system and method which provides portable information handling system battery charge management to support a quick start.

In accordance with the present invention, a system and method are provided which substantially reduce the disadvantages and problems associated with previous methods and systems for portable information handling system battery charge management. A switch physically disconnects a battery from a battery discharge path that powers information handling system components when the battery reaches a charge level associated with booting the information handling system. When connected to an external power source, the information handling system boots without delay for charging with the remaining charge of the battery sufficient to combine with external power and overcome surge current associated with boot.

More specifically, a tablet portable information handling system is built in a planar housing with a rechargeable battery to power processing components, such as central processing unit (CPU), random access memory (RAM), a solid state drive (SSD), a display and a wireless network interface card (WNIC). External power provided from an external power source, such as an AC-to-DC converter and USB adapter, also powers the processing components and uses extra power to recharge the battery. In boot, a power manager handles current surges associated with bringing components up to an operational state by using battery power in addition to external power when external power alone is not adequate. In order to ensure adequate battery charge to support a boot, a battery charge manager selectively disconnects the battery from the battery discharge path when the battery charge reaches a critical level, such as a level needed to support boot of the portable information handling system on external power. The battery charge manager automatically reconnects the battery with the battery discharge path when external power is available so that the battery recharges and is available to support a start with the external power source.

The present invention provides a number of important technical advantages. One example of an important technical advantage is that a portable information handling system will start on an external charger in a rapid manner. A battery charge manager monitors battery charge conditions and breaks the battery discharge path above a critical battery charge level. Once the battery discharge path is broken, system charge leakage paths are eliminated so than only battery cell self-discharge reduces the battery charge. By defining the minimum battery charge as an amount greater than that required to start a portable information handling system with a charger attached, the end user is assured of a rapid startup without delays induced to build a battery charge. The amount of "reserve" battery charge for startup is adjusted as system parameters and battery parameters change so that battery charge life is minimally impacted.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Disconnecting a battery from a discharge path that powers an information handling system ensures adequate reserve charge in the battery to provide rapid boot for the information handling system when external power becomes available. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
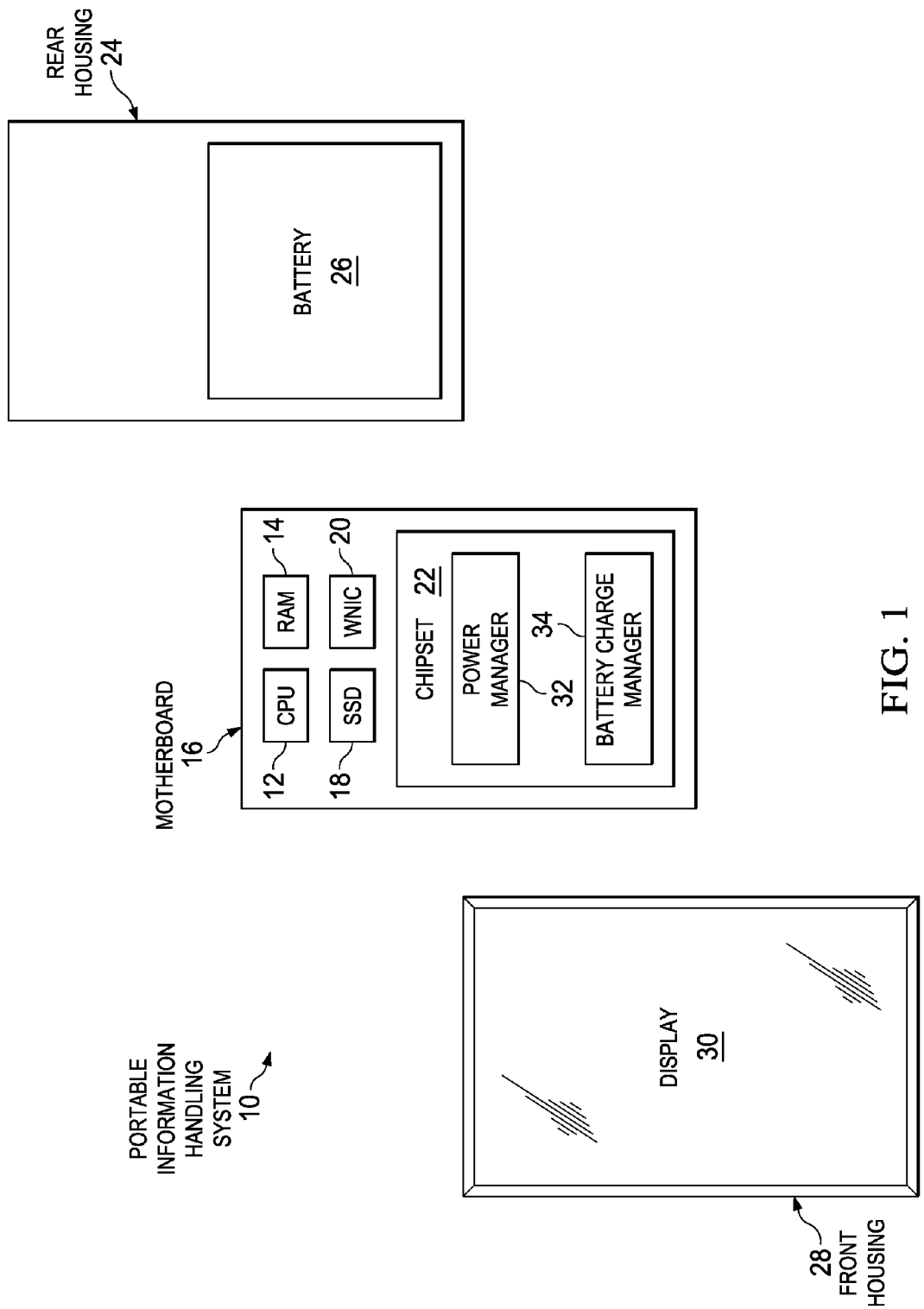
FIG. 1 depicts a blowup view of a tablet portable information handling system having a battery charge reserve to support a quick start.

Referring now to FIG. 1, a blowup view depicts a tablet portable information handling system 10 having a battery charge reserve to support a quick start. Portable information handling system 10 processes information with a central processing unit (CPU) 12 that executes instructions in cooperation with a random access memory (RAM) 14 communicating through a motherboard 16. A solid state drive (SSD) 18 or other persistent memory stores an operating system and applications for execution by CPU 12. A wireless network interface card (WNIC) 20 supports wireless communication with external devices, such as through Bluetooth, wireless local area network (WLAN) and wireless wide area network (WWAN) communications. A chipset 22 includes various processing components and firmware that manage boot of portable information handling system 10 and cooperation between physical processing components, such as to accept inputs and present outputs with a basic input/output system (BIOS). Motherboard 16 is supported in a planar housing between a rear housing 24 that supports a battery 26 and a front housing 28 that supports a display 30. End user's view information generated by CPU 12 as visual images at display 30 and make inputs to CPU 12 with a touchscreen disposed in display 30. Chipset 22 includes a graphics processor that generates visual images and an embedded controller, also known as a keyboard controller, that accepts inputs.

During normal operations, a power manager 32 powers components to support information processing. Power manage 32 provides power to the components from battery 26 and from an external power source if connected, such as an AC-to-DC converter. For example, power manager 32 is firmware code distributed between an embedded controller and battery charger of chipset 22. Since external power sources for tablet portable information handling system 10 sometimes have limited current, power manager 32 manages external power when available in order to meet processing component current demands and recharge battery 26. For instance, if processing component current demand is less than current available from an external power source, then power manager 32 uses excess power to charge battery 26. If a processing task imposes a current demand that is greater than current available from an external power source, then power manager provides the extra needed current by drawing down the charge of battery 26. One example of a situation that draws power from both external power and battery 26 is boot of portable information handling system 10. During boot, multiple processing components are brought to an operational state at the same time so that current draw tends to peak above current available from some AC-to-DC power converters, such as USB-type power supplies. If current demand exceeds available external power and battery power, then boot will fail or will be delayed for a time period while the battery charges to the level required for supplementing the external power supply during boot.

A battery charge manager 34 cooperates with power manager 32 to ensure that adequate current is available for boot of portable information handling system 10. Battery charge manager 34 monitors available battery charge and prohibits boot unless the available battery charge plus the available external power are adequate to bring portable information handling system 10 to an operational state. For example, battery charge manager 34 will require that external power charge battery 26 to a minimum charge state, such as 3 to 5%, before allowing a boot to initiate. If battery 26 is below the minimum charge state when an end user attempts to initiate a boot, the end user experiences a delay during which time battery 26 accepts a charge to get to the minimum charge state.

To prevent the need for charging battery 26 when a boot is initiated, battery charge manager 34 monitors the battery charge state and, at or before the minimum charge state, physically disconnects the battery from powering the processing components so that substantially only battery self-discharge reduces battery reserve charge. With the battery holding at least the minimum charge state in reserve, battery charge manager 34 is able to immediately initiate boot of information handling system 10 as soon as external power is connected by physically re-connecting the battery to power the processing components. Breaking the battery discharge path above the critical charge level need for reboot initiates an immediate power shutdown of information handling system 10, so battery charge manage 34 issues a warning to the end user as the critical battery charge is approached to allow the end user time to connect external power or to shut the system down normally. With the battery discharge path disconnected, all system leakage paths are shutdown so that only battery self-discharge will reduce the battery charge state. Connecting external power allows battery charge manager 34 to immediately reconnect the battery discharge path so that the battery is able to accept a charge. For example, a field effect transistor (FET) managed by an embedded controller is automatically closed to connect battery 26 with external power whenever external power becomes available. Once external power is available, the embedded controller has power to execute battery charge manager 34, to confirm that battery 26 has the minimum charge state, and to initiate boot.

In one embodiment, battery charge manager 34 has a minimum charge state fixed in memory and programmed to cause disconnect of the battery from power the information handling system when external power is not available. In alternative embodiments, the minimum charge state adapts to program usage so that the battery charge is available as much as possible without impacting the reserve charge needed to support system boot. For example, battery charge manager 34 may increase the minimum charge state if, over time, an end user applies external power that has less current than expected so that greater amounts of battery current is needed to support boot. As another example, battery charge manager 34 may decrease or even eliminate the minimum charge state if, over time, an end user applies external power that has greater than expected current. For instance, battery charge manager 34 monitors charging current to track the smallest available current over a defined historical time frame and uses that charging current to set the minimum battery charge state. Alternatively, battery charge manager 34 tracks charge current available at different locations, such as work and home determined by GPS or network identifiers, and sets the minimum battery charge state based upon the next location at which the end user is expected to start the information handling system.

In one alternative embodiment, battery charge manager 34 monitors current usage during boot over a historical time frame and applies the boot current usage to determine the minimum battery charge state. For example, boot current may increase when added components or added functionality is brought to an operational state. Similarly, boot current may decrease when removed or changed components or functionality change power consumption characteristics. Indeed, peak boot current may change if a boot sequence is altered to start components or processes sequentially instead of simultaneously. By tracking the maximum boot current experienced over a historical time frame, battery charge manager 34 adapts the minimum charge level to expected current draw at boot so that end users have as much of an available battery charge allowed for use.

In another alternative embodiment, battery charge manager 34 adapts the minimum battery charge level based upon battery characteristics. For example, battery charge manager 34 will increase reserve battery charge as a battery ages to help compensate for increased self-discharge rates. Battery characteristics may be determined by tracking dates of battery changes or tracking impedance of the battery. Other types of battery performance characteristics may be tracked to adjust the minimum battery charge, such as average operating temperature, etc.

Figure 2:
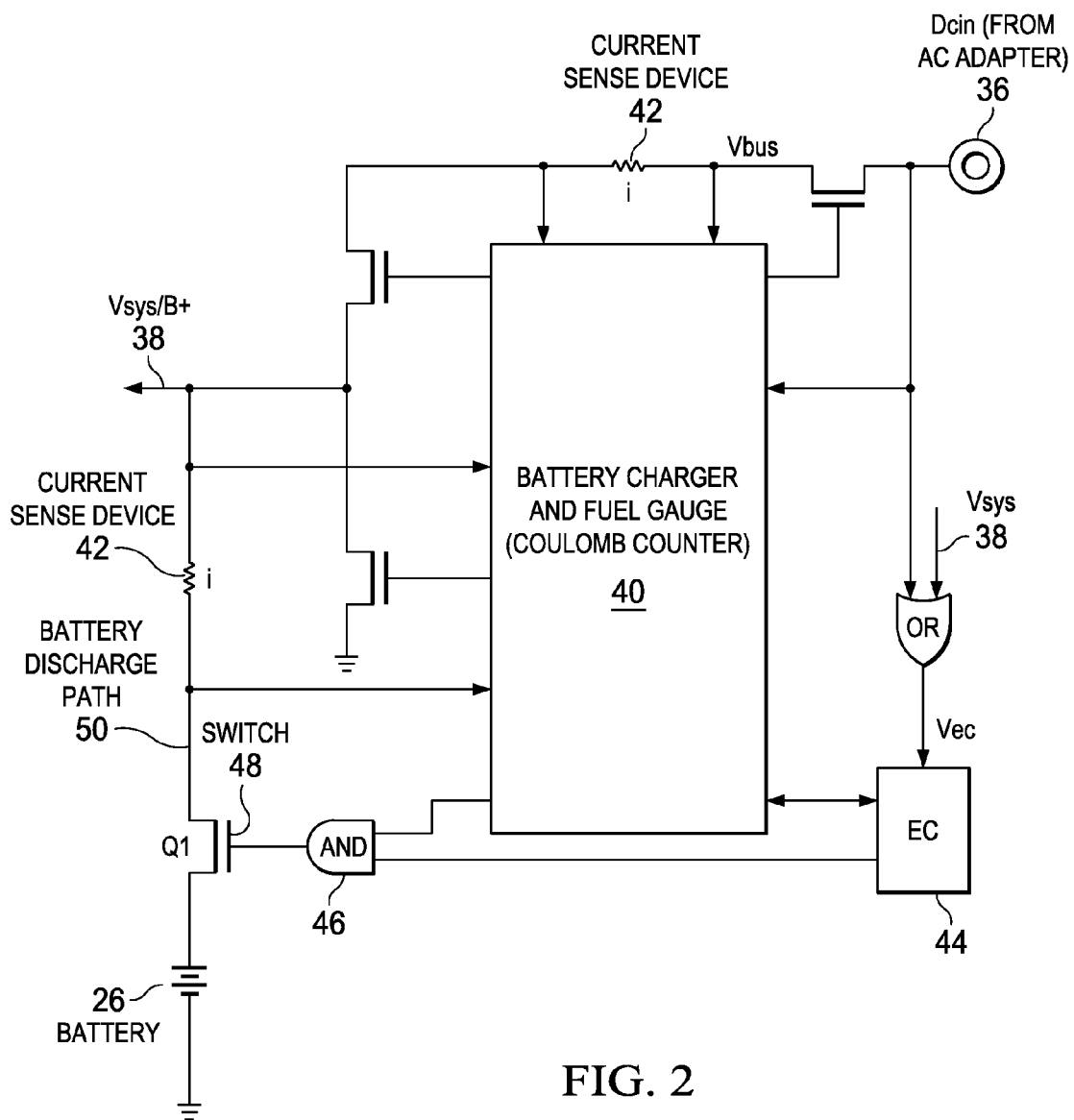
FIG. 2 depicts an electrical circuit block diagram of a portable information handling system power subsystem that disconnects a battery from a battery discharge path upon reaching a critical battery charge level associated with quick start of the portable information handling system.

Referring now to FIG. 2, an electrical circuit block diagram depicts a portable information handling system power subsystem that disconnects a battery 26 from a battery discharge path 50 upon reaching a critical battery charge level associated with quick start of the portable information handling system. In the example embodiment, external power is provided through DCin 36 from an external power adapter to provide power to system components through a Vbus and then Vsys bus 38. A battery charger and fuel gauge 40 manages external power to power Vsys 38 and to send extra power to recharge battery 26 by monitoring power consumption with current sense devices 42, such as sense resistors. An embedded controller 44 cooperates with battery charger 40 to manage power, such as with a power manager 32 supported in embedded code distributed between embedded controller 44 and battery charger 40. When the information handling system is shutdown, embedded controller 44 is able to run using power from Vsys 38 or with power provided directly from the external power source through DCin 36.

Battery charger 40 and embedded controller 44 control an "and" gate 46 that opens and closes a switch 48, such as an FET. Switch 48 opens to disconnect battery 26 from battery discharge path 50 and closes to connect battery 26 with battery discharge path 50. When switch 48 opens to disconnect battery 26 from battery discharge path 50, charge in battery 26 is lost substantially only to self-discharge. Embedded controller 44 and battery charger 40 disconnect battery 26 from battery discharge path 50 if external power is not detected and the charge in battery 26 falls to a threshold, such as a minimum charge level needed for system boot. Embedded controller 44 and battery charger 40 reconnect battery 26 anytime external power is detected as available to allow a system boot. If battery discharge path 50 is disconnected, embedded controller 44 will power up when external power is connected to manage to battery charge and system boot so that adequate power is available to boot the system before boot is initiated.

Figure 3:
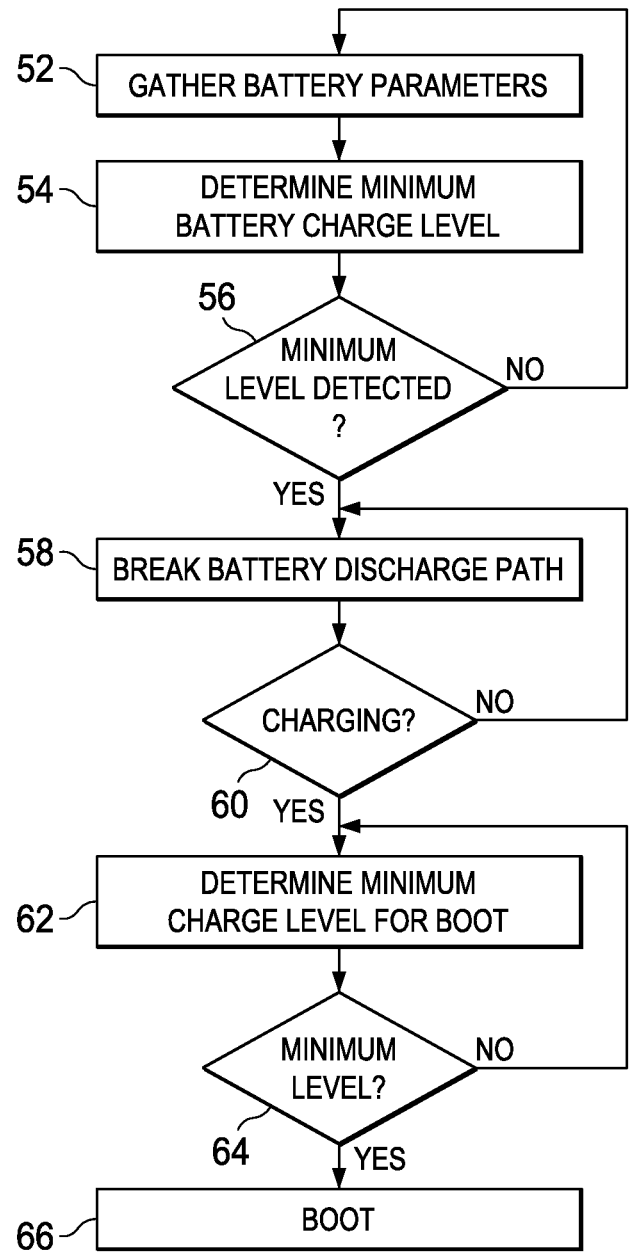
FIG. 3 depicts a flow diagram of a process for disconnecting a battery from a discharge path with adequate power to support a boot of a portable information handling system with the battery providing power in cooperation with an external power source.

Referring now to FIG. 3, a flow diagram depicts a process for disconnecting a battery from a discharge path with adequate power to support a boot of a portable information handling system with the battery providing power in cooperation with an external power source. The process starts at step 52 with a gathering of battery parameters, such as a minimum charge level setting or information needed to determine the minimum charge level setting as set forth above. At step 54, the minimum battery charge level is determined and monitoring for the minimum battery charge level is initiated. At step 56, a determination is made as to whether the minimum battery charge level is reached and, if not, the process returns to step 52. If the minimum battery charge level is reached, the process continues to step 58 to break the battery discharge path so that substantially only battery self-discharge reduces the battery charge.

After the battery disconnects from the system the process continues to step 60 to determine if the system has started charging. For example, charging is detected if the embedded controller powers up with power provided from an external power source. If no charging is detected the process returns to step 58 to continue with the battery disconnected. Once charging is detected, the process continues to step 62 to determine that a minimum charge level is available for boot. In one embodiment, a slight delay is made to allow charging to make up for self-discharge. Alternatively the battery charger may test the battery to ensure adequate current is available, although in many cases batteries on small portable tablet information handling systems do not include battery management units (BMU) or other intelligence that actively tracks battery charge. If the minimum charge level is not present, the process returns to step 62. If the minimum charge level is present, the process continues to step 66 to allow boot.

Although the present invention has been described in detail, it should be understood that various changes, substitutions and alterations can be made hereto without departing from the spirit and scope of the invention as defined by the appended claims.

What is claimed is:

1. A portable information handling system comprising:
   a planar housing;
   a processor disposed in the planar housing and operable to execute instructions to process information;
   a memory disposed in the planar housing and interfaced with the processor, the memory operable to store the information;
   a display disposed in the planar housing and interfaced with the processor and memory, the display operable to present the information as visual images;
   a battery disposed in the housing and operable to power the processor, memory and display;
   a battery switch interfaced with the battery and operable to disconnect the battery from providing power to the processor, memory and display;
   a power manager disposed in the housing and operable to manage power applied by the battery for powering the processor, memory and display, and operable to accept power applied from an external charger for powering the processor, memory and display, and for charging the battery; and
   a battery charge manager interfaced with the battery switch and power manager, the battery charge manager operable to determine a minimum battery charge level and to activate the switch to disconnect the battery at the minimum charge level;
   wherein the processor, memory and display have surge current operational states that draw current in excess of current available from the external charger and the minimum battery charge level comprises a battery charge reserve sufficient to supplement external charger current during the surge current operational states.

2. The portable information handling system of claim 1 wherein the minimum charge level comprises a battery charge reserve sufficient to power a boot of an operating system on the processor to an operational state.

3. The portable information handling system of claim 1 wherein the minimum charge level comprises a battery charge sufficient to power a boot of an operating system on the processor to an operational state in cooperation with the external charger.

4. The portable information handling system of claim 1 wherein the battery charge manager is further operable to detect power applied by the external charger and, in response to the detecting, to connect the battery with the switch to accept power for charging the battery from the external charger.

5. The portable information handling system of claim 1 wherein the battery charge manager adapts the minimum battery charge level based on battery age.

6. The portable information handling system of claim 1 wherein the battery charge manager adapts the minimum battery charge level based on an available charge current detected during charge events of the battery.

7. The portable information handling system of claim 1 wherein the battery charge manager adapts the minimum battery charge level based on current consumption detected during boot events.

8. The portable information handling system of claim 1 wherein the battery switch comprises a FET having an input interfaced with an external power source to automatically connect the battery if an external power source is applied to charge the battery.

9. A portable information handling system power system comprising:
   a battery operable to store a charge for power processing components through a battery discharge path of the portable information handling system;
   an external power supply operable to accept external power for powering the processing components and charging the battery;
   a battery charger interfacing with the external power supply and battery;
   a switch disposed in the battery discharge path and operable to selectively connect and disconnect the battery with the battery discharge path; and
   a power controller interfaced with the external power supply, the battery charger and the switch, the power controller operable to command the switch to disconnect the battery from the battery discharge path to maintain a minimum battery charge of above an amount needed to boot an operating system of the portable information handling system to an operational state;
   wherein the external power supply provides current at a level insufficient to meet current demand during current surge operational states and the minimum battery charge comprises a battery charge reserve sufficient to supplement external charger current during the current surge operational states.

10. The portable information handling system power system of claim 9 wherein the minimum battery charge further comprises an amount needed to boot the operating system of the portable information handling system to an operational state when boot is initiated with external power applied by the external power supply.

11. The portable information handling system power system of claim 10 wherein the power controller is further operable to:
   detect application of external power by the external power supply; and
   in response to detecting, to connect the battery to the battery discharge path.

12. The portable information handling system power system of claim 10 wherein the power controller determines the minimum battery charge at least in part from battery age.

13. The portable information handling system power system of claim 10 wherein the power controller determines the minimum battery charge at least in part from an expected external power supply current available at boot of the portable information handling system.

14. The portable information handling system power system of claim 10 wherein the power controller determines the minimum battery charge at least in part from an expected power draw at boot of the portable information handling system.

* * * * *